United States Patent [19]

Yamashita et al.

[11] Patent Number: 5,038,219
[45] Date of Patent: Aug. 6, 1991

[54] VIDEO SIGNAL RECORDING APPARATUS

[75] Inventors: Keitaro Yamashita, Tokyo; Yutaka Nishikata, Kanagawa, both of Japan

[73] Assignee: Sony Corporation, Tokyo, Japan

[21] Appl. No.: 599,026

[22] Filed: Oct. 17, 1990

[30] Foreign Application Priority Data

Oct. 31, 1989 [JP] Japan .................................. 1-284062

[51] Int. Cl.[5] .............................................. H04N 9/79
[52] U.S. Cl. ..................................... 358/310; 358/335; 358/185; 360/9.1
[58] Field of Search ............... 358/185, 310, 320, 330, 358/335; 360/9.1, 22, 27, 29, 30

[56] References Cited

U.S. PATENT DOCUMENTS

| 4,942,466 | 7/1990 | Sandbank et al. | 358/133 |
| 4,963,991 | 10/1990 | Honjo | 358/335 |
| 4,989,091 | 1/1991 | Lucas | 358/140 |

Primary Examiner—Roy N. Envall, Jr.
Assistant Examiner—Thai Tran
Attorney, Agent, or Firm—Alvin Sinderbrand; William S. Frommer

[57] ABSTRACT

In an apparatus for recording a selected one of at least two different types of video signals, such as, a studio standard video signal and a video signal transmitted in the MUSE system, which are respectively characterized by different numbers of effective scanning lines and different durations of the video parts in the respective effective scanning lines, analog-to-digital conversion circuits convert an input video signal of the selected type into digital signals, a digital signal processing ciruit successively writes and reads, and thereby temporarily stores, samples of the digital signals from the analog-to-digital conversion circuits, digital-to-analog conversion circuits convert digital signals read by the digital signal processing circuit into analog signals, a recording signal processing circuit receives such analog signals and processes the same to provide a recording signal for recording on a recording medium, and a control circuit for the digital signal processing circuit is operative to select the samples of the digital signal which are successively written, or read from the digital signal processing circuit so as to limit, in the recording signal, the number of the effective scanning lines and/or the duration of the video part in each of the effective scanning lines to the least of the different numbers of effective scanning lines and the shortest of the different durations.

12 Claims, 5 Drawing Sheets

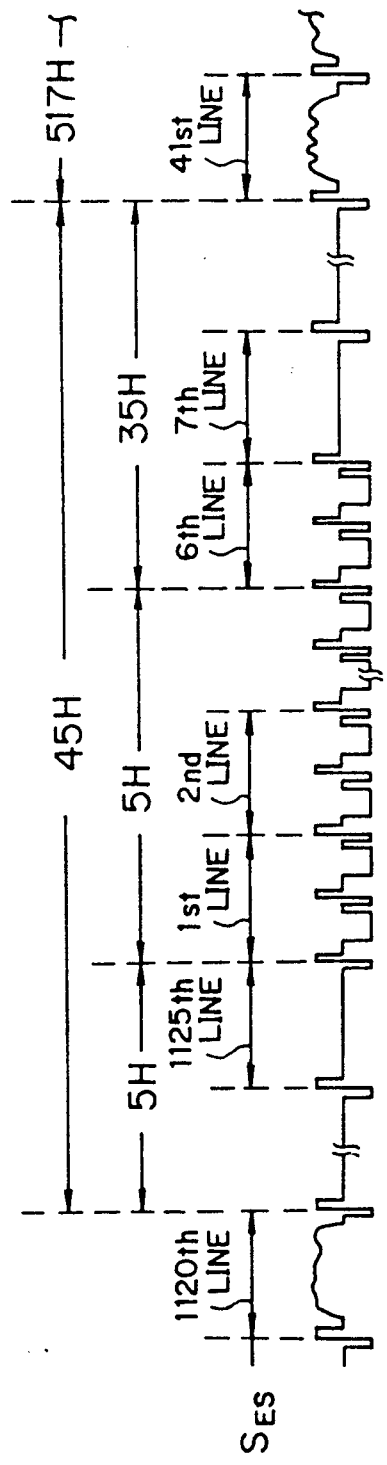
FIG. 2A₁
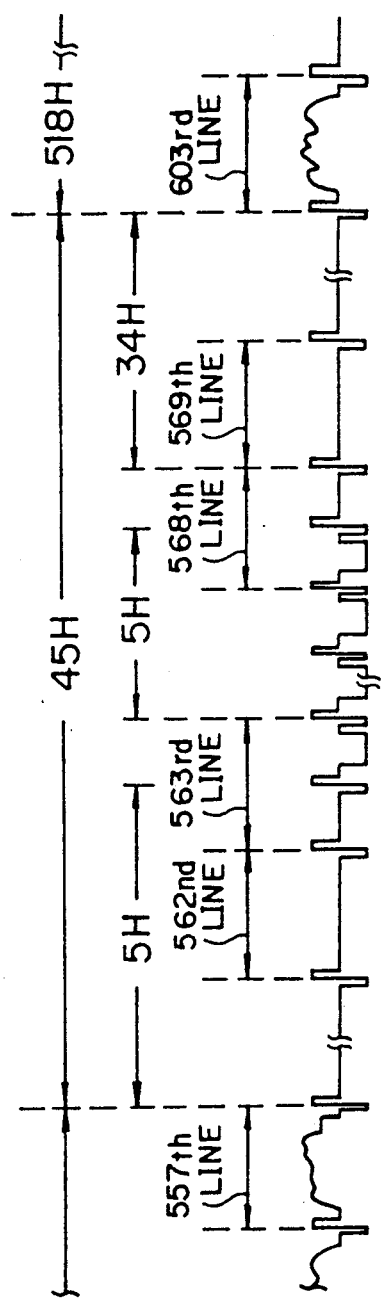
FIG. 2A₂

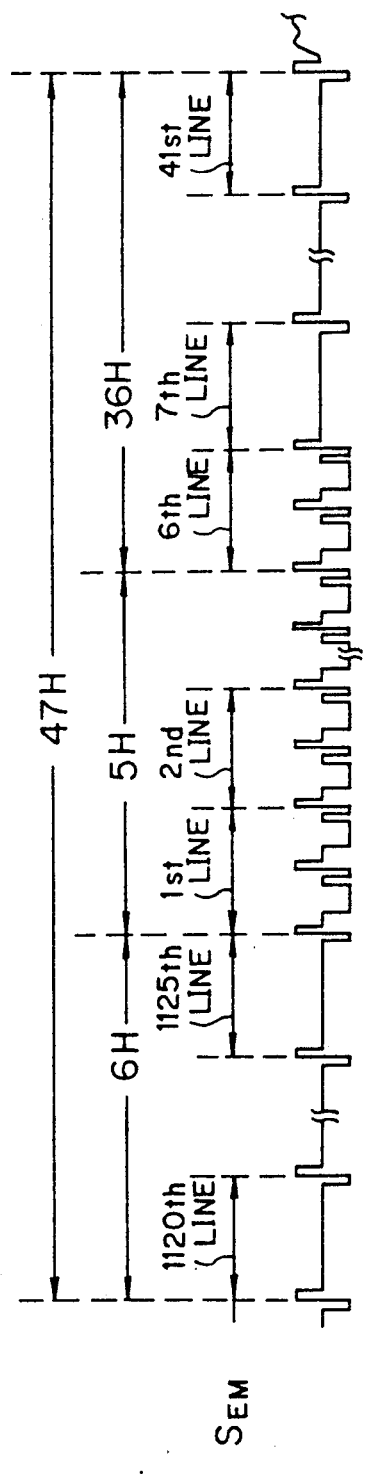
FIG. 2B1
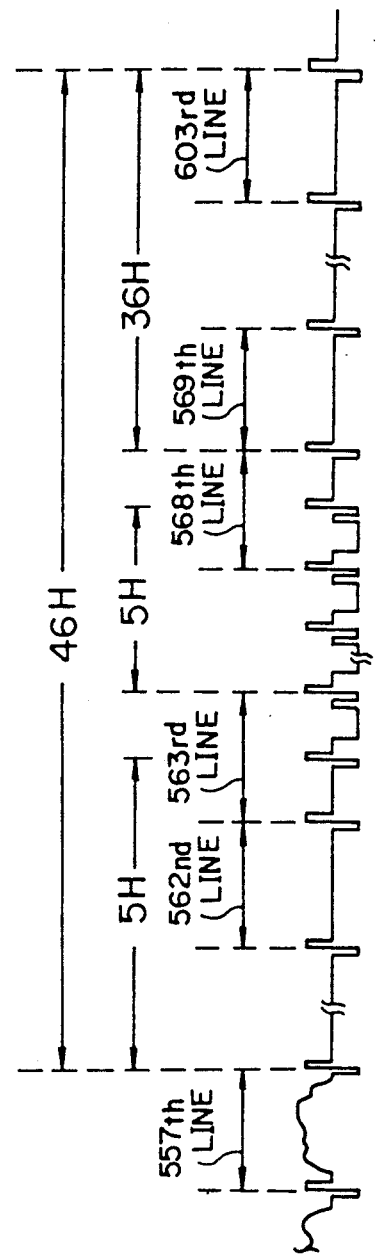
FIG. 2B2

FIG. 4A₁
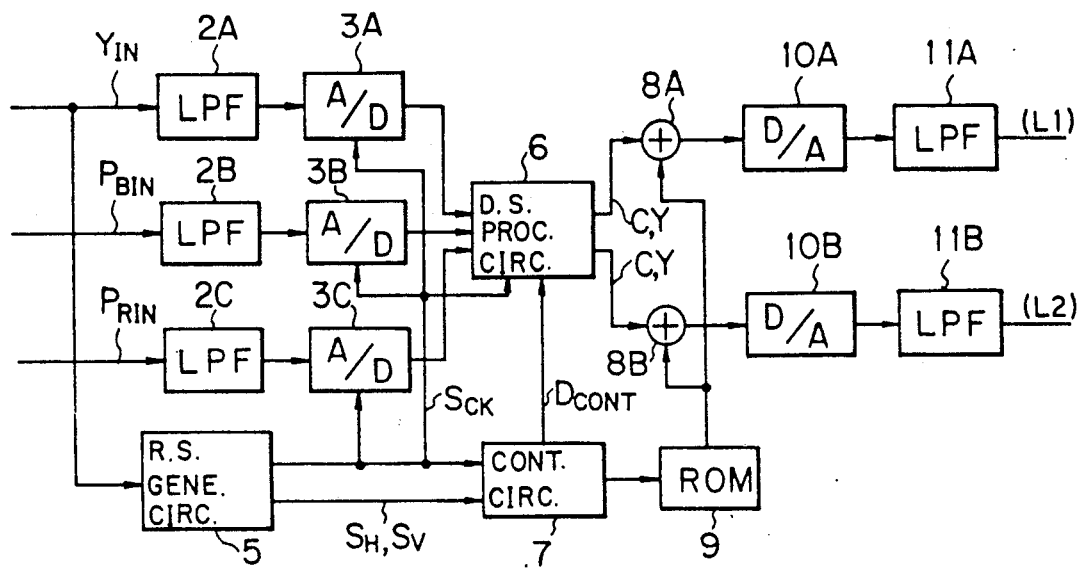
FIG. 4A₂
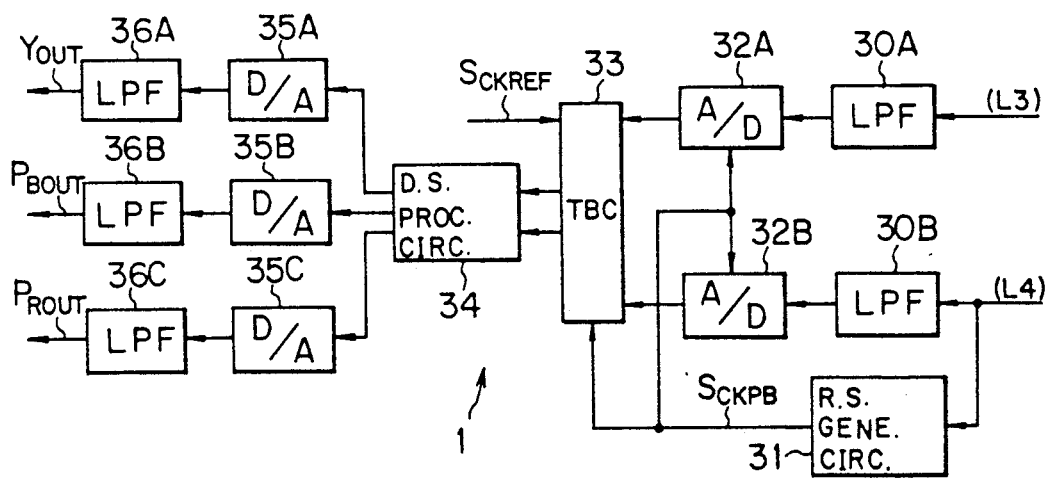

VIDEO SIGNAL RECORDING APPARATUS

Background of the Invention

1. Field of the Invention

This invention relates to a video signal recording apparatus and is particularly applicable to a video tape recorder for recording video signals of high quality television.

2. Description of the Prior Art

Heretofore, in a video tape recorder for recording video signals of high quality television, studio standard video signals (BTA S-001) are subjected to band compression after being digitally processed. More specifically, in the known video tape recorder, a video signal including a luminance signal and color difference signals is converted by an analog-to-digital conversion circuit into a digital signal which is applied to a digital signal processing circuit, where it is subjected to time base compression. The output signal of the digital signal processing circuit is, for example, divided into two channel signals according to a predetermined format and such channel signals are converted into analog signals.

Thereafter, as shown in FIG. 1, the video signal for a horizontal scanning period is converted into a time compressed integration (TCI) signal which includes a chroma signal C processed in chroma line order and a luminance signal Y arranged in succession after a burst-like reference signal CK which follows a synchronizing signal SYNC, so that the high quality television video signal is subjected to time base compression.

In the known video tape recorder being here described, the part of the video signal other than the effective scanning line portion is eliminated, and each horizontal scanning period of the TCI signal is correspondingly extended.

As shown in FIGS. 2A$_1$ and 2A$_2$ the so-called studio standard video signal S$_{ES}$ is standardized so that the frame frequency is 60 Hz and the number of lines per frame is 1125, of which the 41st to 557th lines, and the 603rd to 1120th lines are assigned to be the effective scanning lines. Furthermore, as shown in FIG. 3A, in the studio standard video signal S$_{ES}$, the video part is assigned to occupy 25.86 μsec. of the effective scanning line period.

Hence, in a studio type video tape recorder, the video parts of only the 41st to 557th lines and the 603rd to 1120th lines, that is, the effective scanning lines, are extracted to form the TCI signal, whereby the frequency band of the TCI signal can be reduced. Thereafter, in the known video tape recorder, the TCI signal thus formed is suitably processed, for example, is subjected to pre-emphasis and is then converted, by frequency modulation, into a recording signal, which can be recorded by a magnetic head on a magnetic tape with relatively high density.

In a signal reproducing operation, a reproduced signal outputted by the magnetic head is frequency demodulated and then subjected to de-emphasis to reproduce the TCI signal.

The TCI signal thus reproduced is converted into a digital signal which is, in turn, subjected to time base expansion so as to derive a luminance signal and color difference signals.

Because of the time base compression, the video signal can be recorded with high density and can be recorded and reproduced with high efficiency.

Sometimes high quality television video signals of this type are transmitted in a so-called multiple sub-nyquist sampling encode (MUSE) system. As shown in FIGS. 2B$_1$ and 2B$_2$ a video signal S$_{EM}$ transmitted in the MUSE system is equal to the studio standard video signal S$_{ES}$ in frame frequency and in line number. However, the video signal S$_{EM}$ has a smaller number of effective scanning lines than the studio standard video signal S$_{ES}$, and its transmission is carried out with the elimination of the video parts of the studio standard video signal S$_{ES}$ which are assigned to the 41st, 603rd and 1120th lines.

Further, as shown in FIG. 3B, in the video signal S$_{EM}$ transmitted in the MUSE system, only 25.19 μsec. of each effective scanning line is assigned to the video part, and its transmission is carried out with elimination of the video parts of the studio standard video signal S$_{ES}$ which correspond to the periods of 0.335 μsec. before and after the 25.19 μsec. period assigned to the video part of each effective scanning line in the MUSE system.

Therefore, a video signal S$_{EM}$ transmitted in the MUSE system can be recorded and reproduced with a video tape recorder which can record and reproduce a studio standard video signal S$_{ES}$.

However, in the case where a video signal S$_{EM}$ transmitted in the MUSE system is recorded or reproduced with a video tape recorder which can record and reproduce a studio standard video signal S$_{ES}$, the video signals of the 41st, 603rd and 1120th lines, to which no video parts are assigned in the MUSE system, are nevertheless recorded as TCI signals, with the result that it is difficult to fully and most efficiently utilize the magnetic tape.

OBJECTS AND SUMMARY OF THE INVENTION

Accordingly, it is an object of this invention to provide a video signal recording apparatus which can record and reproduce video signals more efficiently than a conventional video signal recording apparatus.

More specifically, it is an object of this invention to provide a video signal recording apparatus which can record and reproduce studio standard video signals as well as video signals transmitted in the MUSE system, and which avoids wasted recording operations and effects most efficient utilization of the magnetic tape or other recording medium when either type of video signal is employed.

In accordance with an aspect of this invention, in an apparatus for recording a selected one of at least two different types of video signals respectively characterized by different numbers of effective scanning lines and different durations of the video parts in the respective effective scanning lines, and having analog-to-digital conversion circuits for converting an input video signal of the selected type into digital signals, a digital signal processing circuit for successively writing and reading, and thereby temporarily storing, samples of the digital signals from the analog-to-digital conversion circuits, digital-to-analog conversion circuits for converting digital signals read by the digital signal processing circuit into analog signals, and a recording signal processing circuit receiving such analog signals and processing the same to provide a recording signal for recording on a recording medium; a control circuit for the digital signal processing circuit is operative to select the samples of the digital signals which are successively written, or read from the digital signal processing circuit so as to limit, in the recording signal, the number of the effective scanning lines and/or the duration of the video part in each of the effective scanning lines to the least of the different numbers of effective scanning lines and the shortest of the different durations, respectively, irrespective of the type of the input video signal.

In the case of a video signal recording apparatus according to this invention which is adapted for recording and reproducing studio standard video signals as well as video signals transmitted in the MUSE system, if the selected input video signal is a studio standard video signal, predetermined periods of the input video signal are omitted from the signal recorded on the recording medium. More specifically, the omitted periods of the input video signal, when the latter is a studio standard video signal, correspond to those lines, for example, the 41st, 603rd and 1120th lines, which are not included in the effective scanning lines of a video signal transmitted in the MUSE system. Alternatively or additionally, when the input video signal is a studio standard video signal, the omitted periods of the input video signal ma correspond to the video parts of the effective scanning lines of the input video signal which extend beyond the video parts of the effective scanning lines of a video signal transmitted in the MUSE system.

The above, and other objects, features and advantages of the invention, will be apparent in the following detailed description of a preferred embodiment when read in connection with the accompanying drawings.

Figure 3A:
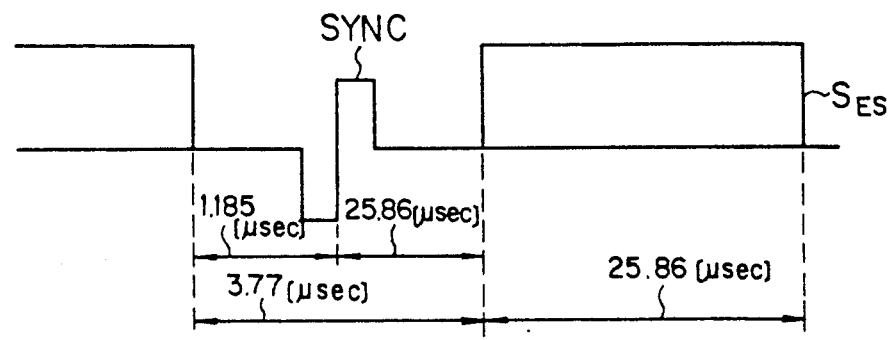
Figure 3B:
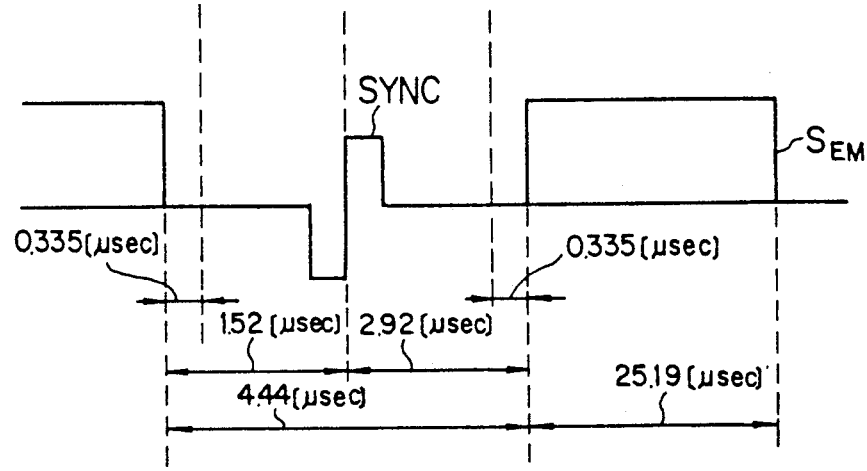
Figure 5:
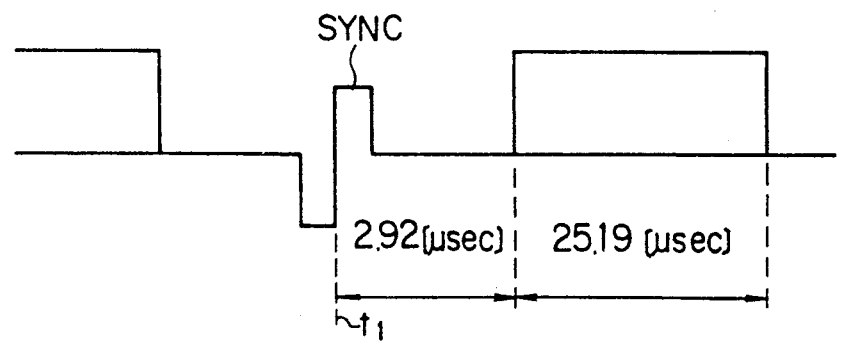

FIGS. $2A_1$ and $2A_2$ and FIGS. $2B_1$ and $2B_2$ are signal waveform diagrams showing the effective scanning lines of a studio standard video signal and of a video signal transmitted in the MUSE system, respectively;

FIGS. 3A and 3B are signal waveform diagrams showing video parts for each effective scanning line of a studio standard video signal and of a video signal transmitted in a MUSE system, respectively;

FIGS. $4A_1$, $4A_2$ and 4B comprise block diagram showing the circuit arrangement of a video tape recorder according to an embodiment of this invention; and FIG. 5 is a signal waveform diagram to which reference will be made in describing the operation of the video tape recorder of FIGS. $4A_1$, $4A_2$ and 4B.

DETAILED DESCRIPTION OF A PREFERRED EMBODIMENT

A preferred embodiment of this invention will now be described with reference to FIGS. $4A_1$, $4A_2$ and 4B in which reference numeral 1 designates a video tape recorder (VTR) having a luminance signal $Y_{IN}$ and color difference signals $P_{BIN}$ and $P_{RIN}$, which form a video signal, applied to low-pass filters 2A, 2B and 2C, where they are subjected to respective band limitation.

The output signals of the low-pass filters 2A, 2B and 2C are respectively applied to analog-to-digital (A/D) conversion circuits 3A, 3B and 3C, where they are converted into respective digital signals.

A reference signal generating circuit 5, which may include a phase-locked loop (PLL) circuit (not shown), forms a clock signal $S_{CK}$ having a frequency of 44.55 MHz and which has, as its reference, a synchronizing signal SYNC superposed on the luminance signal $Y_{IN}$. The clock signal $S_{CK}$ thus formed is applied to the A/D conversion circuits 3A, 3B and 3C, to a digital signal processing circuit 6, and to a control circuit 7.

Thus, in the A/D conversion circuits 3A, 3B and 3C, the luminance signal $Y_{IN}$, and the color difference signals $P_{BIN}$ and $P_{RIN}$ are converted into respective digital signals, namely, a digital luminance signal, and digital color difference signals, in synchronism with the clock signal $S_{CK}$.

The reference signal generating circuit 5 also suitably separates a vertical synchronizing signal $S_V$ and a horizontal synchronizing signal $S_H$ from the luminance signal $Y_{IN}$, and such signals $S_V$ and $S_H$ are also applied to the control circuit 7.

The digital signal processing circuit 6 includes a memory circuit (not shown) in which the digital luminance signal and the digital color difference signals are successively stored with the clock signal $S_{CK}$ as a reference.

Furthermore, in response to address data $D_{CONT}$ from the control circuit 7, the digital signal processing circuit 6 successively reads the digital luminance signal and the digital color difference signals from the memory thereof and applies the read-out signals successively to addition circuits 8A and 8B.

Thus, the digital signal processing circuit 6 outputs the digital luminance signal and the digital color difference signals in a predetermined format, thereby producing a chroma signal C and a luminance signal Y forming a TCI signal for each of two channels.

During this operation of the VTR 1 according to this invention, the control circuit 7 outputs the address data $D_{CONT}$ so that only the digital luminance signal and digital color difference signals representing the video signals of the 42nd to 557th lines and of the 604th to 1119th lines are extracted to form the TCI signal. As a result, in the VTR 1, only the video signals of the 42nd to 557th lines and of the 604th to 1119th lines are selectively recorded.

Thus, in the case where a studio standard video signal $S_{ES}$ is applied to the VTR 1, TCI signals are formed, but with omission of the video signals assigned to the 41st, 603rd and 1120th lines which are included among the effective scanning lines of the video signal $S_{ES}$. On the other hand, in the case where a video signal $S_{EM}$ is transmitted in the MUSE system is applied to the VTR 1, the 41st, 603rd and 1120th lines are not among the effective scanning lines and hence the video signals assigned to all of the effective scanning lines are converted into TCI signals.

In the case of the application to the VTR 1 of the video signal outputted by a conventional studio video tape recorder, TCI signals are formed with the omission of the video signals which are assigned to the 40th, 41st, 603rd and 1120th lines.

Thus, the studio standard video signals $S_{ES}$, the video signals outputted by the conventional studio video tape recorder, and the video signals $S_{EM}$ transmitted according to the MUSE system can be converted into TCI signals of the same format. Accordingly, the construction of the video tape recorder 1 can be substantially simplified.

When, as described above, the recording operation is carried out with the lines eliminated or omitted being included in those assigned to the effective scanning lines in the case of the studio standard video signal $S_{ES}$ and in the case of the video signal outputted by the conventional studio video tape recorder, but which are not included among the effective scanning lines in the case of the video signal $S_{EM}$ transmitted in the MUSE system, a television receiver or monitor adopted for displaying the video signal $S_{EM}$ can also be used for displaying the video signal when the studio standard video signal $S_{ES}$ or the video signal outputted by the conventional studio video tape recorder is recorded and reproduced with the VTR 1 according to this invention.

In practice, the numbers of effective scanning lines of the studio standard video signal $S_{ES}$, the video signal outputted by the conventional studio video tape recorder, and the video signal $S_{EM}$ transmitted in the MUSE system are 1036, 1036 and 1032, respectively. Thus, the number of effective scanning lines of the studio standard video signal $S_{ES}$, and of the video signal outputted by the conventional video tape recorder differ only by about 0.3% from the number of effective scanning lines of the video signal $S_{EM}$ transmitted in the MUSE system. Hence, if the size of the display screen of a television receiver or monitor is selected to accommodate the video signal $S_{EM}$ transmitted in the MUSE system, then the studio standard video signal $S_{ES}$ and the video signal outputted by the conventional studio video tape recorder can also be satisfactorily displayed on such display screen. Thus, the television receiver or monitor used for displaying any of the three types of video signals that may be recorded and reproduced by the VTR 1 according to this invention can be substantially simplified.

If, as in the prior art, a video tape recorder records and reproduces the video signals of all the effective scanning lines of a studio standard video signal $S_{ES}$ or of a video signal outputted by the conventional studio video tape recorder and the reproduced video signal is then displayed on a television receiver or monitor adapted for a video signal $S_{EM}$ transmitted in the MUSE system, then the recorded 41st, 603rd and 1120th lines of the studio standard video signal $S_{ES}$ are not displayed and hence are recorded wastefully.

On the other hand, when, as in accordance with the above described embodiment of this invention, only the video signals assigned to the 42nd to 557th lines and to the 604th to 1119th lines are selectively recorded for any and all types of input video signals, the above-described wasteful recording can be avoided, for example, when recording and reproducing a studio standard video signal $S_{ES}$ for display on a monitor or the like particularly adapted for display of a video signal $S_{EM}$ of the MUSE system.

Furthermore, in the case where a known video tape recorder adapted to record and reproduce a studio standard video signal $S_{ES}$ is used for recording a video signal $S_{EM}$ of the MUSE system, tape is wastefully used for recording the 41st, 603rd and 1120th lines which are not effective scanning lines of the video signal $S_{EM}$. On the other hand, when the VTR 1 embodying this invention is used for recording and reproducing a video signal $S_{EM}$ of the MUSE system, the 41st, 603rd and 1120th lines are omitted by the selective recording of only the 42nd to 557th lines and the 604th to 1119th lines. Thus, the tape is most efficiently utilized.

In the VTR 1 embodying the present invention, the control circuit 7 outputs the address data $D_{CONT}$ so as to convert the video signal into a TCI signal of 1122 samples which, as shown on FIG. 5, commences 2.92 $\mu$sec after the time $t_1$ at which the synchronizing signal SYNC is inverted.

Accordingly, when a studio standard video signal $S_{ES}$ or a video signal outputted by a conventional studio video tape recorder is applied to the VTR 1 embodying this invention, such video signal is recorded with the video parts removed or omitted which are those corresponding to the initial and concluding 0.335 $\mu$sec. periods of the 25.86 $\mu$sec. video parts assigned to the 42nd to 557th lines and to the 604th to 1119th lines of the video signal $S_{ES}$ (FIG. 3A).

On the other hand, when the video signal $S_{EM}$ transmitted in the MUSE system (FIG. 3B) is applied to the VTR 1, such video signal is recorded with all the video parts assigned to the effective scanning lines, and each having a duration of 25.19 $\mu$sec., converted into TCI signals.

Thus, with the described limitation of the video part of each effective scanning lines being recorded as well as the described limitation of the number of effective scanning lines being recorded, the studio standard video signal $S_{ES}$, the video signal outputted by the conventional studio video tape recorder, and the video signal $S_{EM}$ transmitted in the MUSE system can be converted into TCI signals of the same format, so that the VTR 1 can be much simplified in construction.

With such limitation of the video parts being recorded as well as of the effective scanning lines being recorded, wasteful recording operations can be avoided effectively, and the various types of video signals can be efficiently recorded and reproduced for display on a common monitor or the like externally connected to the VTR 1.

If all the video parts assigned to a studio standard video signal $S_{ES}$ or to a video signal outputted by a conventional studio video tape recorder are sampled with a clock signal $S_{CK}$ having a frequency of 44.55 MHz, then it is necessary to provide 1152 samples per luminance signal $Y_{IN}$.

On the other hand, in the above described embodiment of the invention, in forming each TCI signal with 1122 samples, the color difference signals are processed in the order of lines and, therefore, wasteful data-processing operations can be eliminated for as much as 37 samples, which is the sum of the 30 sample difference between 1122 and 1152 samples in each line and the 30/4 samples.

Since, with the VTR 1 according to this invention, a studio standard video signal $S_{ES}$, a video signal outputted by a conventional studio video tape recorder or a video signal $S_{EM}$ transmitted in the MUSE system, is recorded as a TCI signal formed with the video part of each effective scanning line which is recorded being limited and also with the recorded effective scanning lines being limited, the burst-like reference signal CK added to the TCI signal can be superposed thereon for a relatively long time, which contributes to simplification of the arrangement of the VTR 1.

The video tape recorder of the type being described suffers from the following difficulty: Since a large amount of information is needed to define the input video signals, even if the video signal is converted into a TCI signal, it is difficult for the video tape recorder to record the video signals of a complete field on a single track, for example, as in a VTR for the NTSC system. Therefore, the video signal is recorded on the magnetic tape in accordance with a segment record system in which the video signals of one field are divided so as to be recorded on a plurality of tracks.

Figure 1:
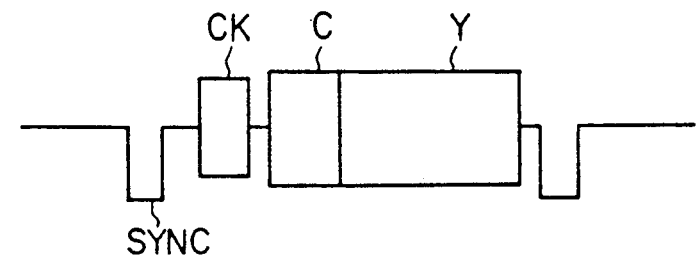
FIG. 1 is a signal waveform diagram showing a TCI signal provided in a video tape recorder.

For this purpose, in a recording operation, the synchronizing signal SYNC and the reference signal CK (FIG. 1) are added to the TCI signal, and, in a reproducing operation, the segment-recorded TCI signal is restored with the synchronizing signal SYNC and reference signal CK as a reference.

Since signals of relatively long duration are recorded as the synchronizing signal SYNC and the reference signal CK, then, in the signal reproducing operation, the reproduced signal can be reliably processed with reference to the synchronizing signal SYNC and the reference signal CK which are readily detected. Thus, the recorded video signal can be reproduced positively with a relatively simple arrangement of the VTR 1.

Figure 4B:
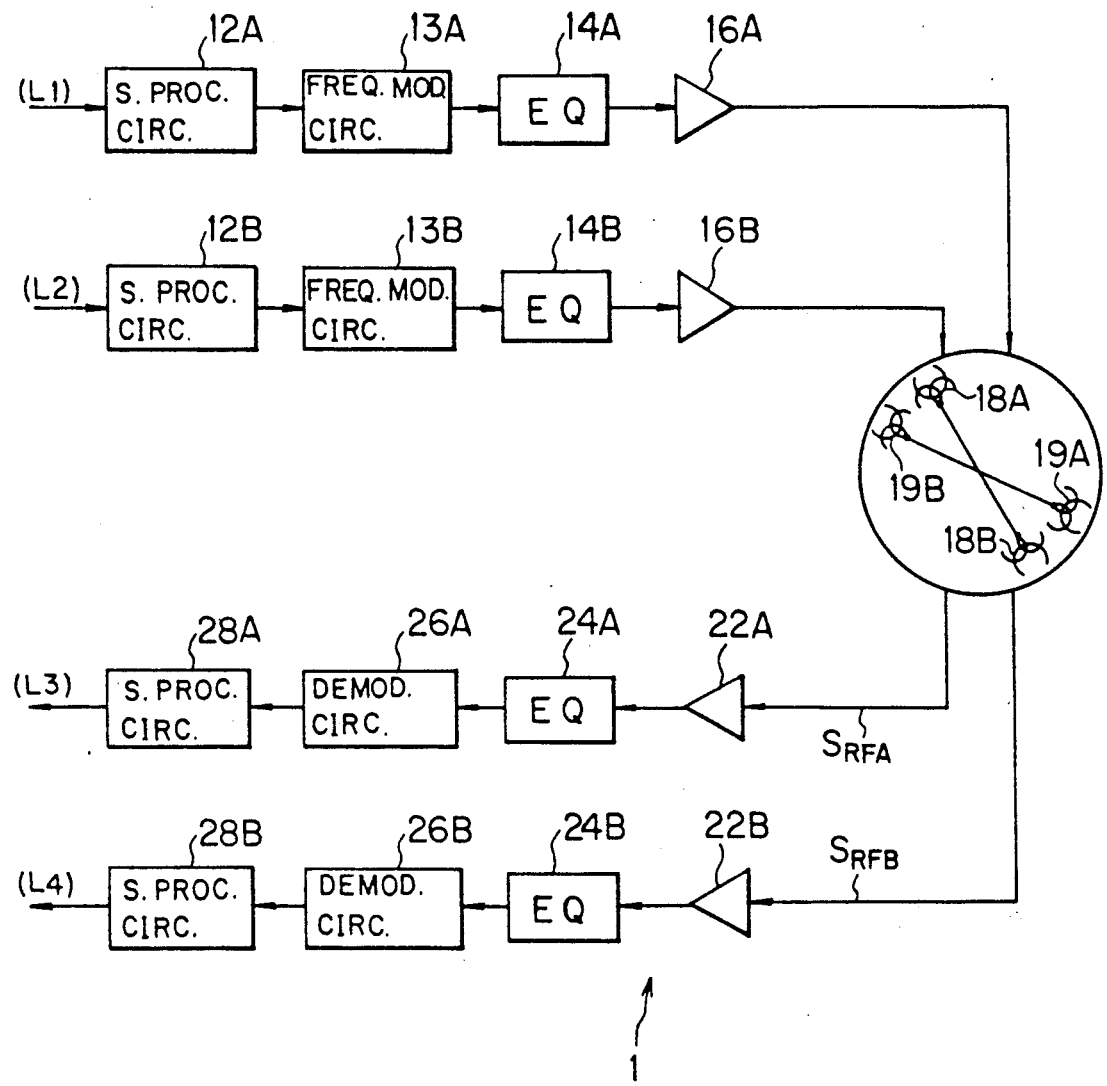

Continuing with the circuit arrangement shown in FIG. 4A$_1$, it will be seen that, in accordance with a control signal from the control circuit 7, a read-only memory circuit (ROM) 9 applies hereinafter further described reference data to the addition circuits 8A and 8B at predetermined times.

In addition circuits 8A and 8B, such reference data are added to the chroma and luminance signal data output from the digital signal processing circuit 6 and forming a TCI signal for each of the two channels. The outputs of the addition circuits 8A and 8B are applied to digital-to-analog (D/A) conversion circuits 10A and 10B, respectively. Thus, the TCI signals converted into analog signals can be obtained from the D/A conversion circuits 10A and 10B.

The reference data provided by the ROM 9 is selected so that it is converted into the synchronizing signal SYNC and the burst-like reference signal CK associated with each TCI signal when the latter is converted into an analog signal by the D/A conversion circuits 10A and 10B. Since the duration of the video part of each TCI signal to be recorded is limited to 25.19 μsec., the burst-like reference signal CK can be recorded for a relatively long duration in association with each TCI signal recorded for an effective scanning line. Such recording of the reference signal CK for a relatively long duration makes it possible to simplify the arrangement of the VTR I.

The outputs of the D/A conversion circuits 10A and 10B are applied to low-pass filter circuits 11A and 11B which suppress harmonic components of the TCI signals converted into respective analog signals. The outputs of the low-pass filters 11A and 11B are applied to signal processing circuits 12A and 12B, respectively, (FIG. 4B) which, for example, effect pre-emphasizing, to provide video signals, which are applied to frequency modulation circuits 13A and 13B, respectively.

The frequency modulation circuits 13A and 13B provide respective recording signals which are applied through equalizer circuits 14A and 14B and amplifier circuits 16A and 16B to magnetic heads 18A and 18B and magnetic heads 19A and 19B, respectively.

The paired magnetic heads 18A and 18B and the paired magnetic heads 19A and 19B are arranged at angular intervals of 180°. While video signals $Y_{IN}$, $P_{BIN}$ and $P_{RIN}$ of one field are being inputted, the magnetic heads scan the magnetic tape a predetermined number of times, and the video signals of that one field are suitably divided and recorded on four recording tracks in a well-known segment mode.

On the other hand, during a signal reproducing operation, reproduced signals $S_{RFA}$ and $S_{RFB}$ provided by the magnetic heads 18A, 18B, 19A and 19B are applied through amplifier circuits 22A and 22B and equalizer circuits 24A and 24B to demodulation circuits 26A and 26B, respectively, where they are frequency demodulated.

The demodulated signals from circuits 26A and 26B are subjected to de-emphasizing in signal processing circuits 28A and 28B, respectively. Such de-emphasis corresponds to the preemphasis in the recording operation, so that the TCI signals are reproduced.

The output signals of the signal processing circuits 28A and 28B are applied to low-pass filter circuits 30A and 30B, respectively, (FIG. 4A$_2$) in which unnecessary high frequency components are suppressed.

A reference signal generating circuit 31 which, for example, may include a PLL oscillation circuit, extracts the reference signal CK from the output signal of the signal processing circuit 28B, and forms a clock signal $S_{CKPB}$ synchronous with such reference signal CK.

The reference signal generating circuit 31 may have a simplified arrangement due to the fact that the reference signal CK is recorded with a relatively long duration, while ensuring that the signal $S_{CKPB}$ is synchronized in phase with the reproduced signals $S_{RFA}$ and $S_{RFB}$.

In analog-to-digital (A/D) conversion circuits 32A and 32B, the output signals of the low-pass filter circuits 30A and 30B are converted into digital signals with the clock signal $S_{CKPB}$ as a reference. The output signals from the A/D conversion circuits 32A and 32B are applied to a time base correction circuit (TBC) 33. The output signals of the A/D conversion circuits 32A and 32B are successively written in the TBC 33 with the clock signal $S_{CKPB}$ as a reference, and the stored signals are read successively from the TBC 33 with the reference clock signal $S_{CKREF}$ as a reference, whereby any time base variations in the output signals of the A/D conversion circuits 32A and 32B are corrected.

Since the clock signal $S_{CKPB}$ is positively synchronized in phase with the reproduced signals $S_{RFA}$ and $S_{RBF}$ by reason of the fact that the reference signal CK is recorded with a relatively long duration, the time base variations can be reliably corrected.

A digital signal processing circuit 34 synthesizes output signals of the time base correction circuit 33, and subjects the resultant signals to time base expansion corresponding to the time base compression effected in the circuit 6. The signal thus processed is divided into a luminance signal and color difference signals. In other words, by means of the digital signal processing circuit 34, the luminance signal and the color difference signals are obtained for the 42nd to 557th lines and the 604th to 1119th lines assigned as the effective scanning lines, and for the video part of each such effective scanning line having a duration of 25.19 μsec.

The luminance signal and the color difference signals outputted by the digital signal processing circuit 34 are applied to digital-to-analog (D/A) conversion circuits 35A, 35B and 35C, respectively, for conversion into analog signals. Such analog signals are applied to low-pass filters (LPFs) 36A, 36B and 36C, respectively, where unnecessary harmonic components are suppressed. Thus, an output luminance signal $Y_{OUT}$, and output color difference signals $P_{ROUT}$ and $P_{BOUT}$ are obtained from LPF 36A and from LPFs 36B and 36C, respectively.

In the above described VTR 1 embodying this invention, the low-pass filter circuits 11A and 11B, the signal processing circuits 12A and 12B, the frequency modulation circuits 13A and 13B, the equalizer circuits 14A and 14B, and the amplifier circuits 16A and 16B form a recording signal processing circuit for recording the output signals of the D/A conversion circuits 10A and 10B on the magnetic tape.

Further, in the above-described embodiment, the input video signals including the luminance signal $Y_{IN}$ and the color difference signals $P_{BIN}$ and $P_{RIN}$ are applied through the low-pass filter circuits 2A, 2B and 2C to the A/D conversion circuits 3A, 3B and 3C, respectively, where they are converted into digital signals, which are stored successively in the digital signal processing circuit 6.

With respect to the luminance signal $Y_{IN}$ and the color difference signals $P_{BIN}$ and $P_{RIN}$ stored in the digital signal processing circuit 6, the TCI signals are formed only from the 25.19 μsec. parts extracted from the video parts assigned to the 42nd to 557th lines and the 604th to 1119th lines, and each such TCI signal is added to the synchronizing signal SYNC and the burst-like reference signal CK in the addition circuits 8A and 8B.

The TCI signals with the SYNC and burst-like reference signal CK added thereto are applied through the D/A conversion circuits 10A and 10B, the low-pass filter circuits 11A and 11B, the signal processing circuits 12A and 12b, the frequency modulation circuits 13A and 13B, the equalizer circuits 14A and 14B, and the amplifier circuits 16A and 16B to the magnetic heads 18A and 18B and the magnetic heads 19A and 19B for recording on the magnetic tape in a segment mode.

On the other hand, in a signal reproducing operation, the reproduced signals $S_{RFA}$ and $S_{RFB}$ outputted by the magnetic heads 18A, 18B, 19A and 19B are converted into the original TCI signals with the aid of the amplifier circuits 22A and 22B, the equalizer circuits 24A and 24B, the demodulation circuits 26A and 26B, the signal processing circuits 28A and 28B, and the low-pass filter circuits 30A and 30B. The TCI signals are converted into digital signals by the A/D conversion circuits 32A and 32B, and the resulting digital signals are applied to the time base correction circuit 33.

The reference signal generating circuit 31 forms the clock signal $S_{SKPB}$ synchronous with the reference signal CK, and such clock signal $S_{CKPB}$ is used as a reference by the circuit 33 in correcting any time base variation.

The TCI signals time-base-corrected by the time base correction circuit 33 are converted by the digital signal processing circuit 34 into the luminance signal $Y_{out}$ and the color difference signals $P_{BOUT}$ and $P_{ROUT}$ which are outputted through the low-pass filters 36A, 36B and 36C.

In the above-described video tape recorder according to this invention, the input video signal which is recorded is limited to 25.19 μsec. periods of the video parts assigned to the 42nd to 557th lines and the 604th to 1119th lines, and, accordingly, the reference signal CK can be, and is recorded with a relatively long duration. Hence, wasteful recording is eliminated, and the video signal can be recorded and reproduced in conformance with a monitor or display unit externally connected to the VTR 1.

In the described embodiment of the invention, the signal recording operation is carried out with the effective scanning lines of the input video signal, as well as the video parts assigned to the effective scanning lines, being limited. However, the signal recording operation according to this invention may be carried out with either the recorded effective scanning lines or the recorded video parts thereof being limited.

Further, in the above-described embodiment of the invention, the limiting of the effective scanning lines and of the video parts thereof which are recorded as TCI signals is effected by the selective outputting of the luminance signal and the color difference signals by the digital signal processing circuit 5. However, a video tape recorder according to this invention may be designed so that the luminance signal and the color difference signals are selectively input to the digital signal processing circuit 6 for limiting the effective scanning lines and the video parts thereof which are recorded.

Furthermore, in the above-described embodiment, the limiting of the video part of each effective scanning line which is recorded is availed of to permit the reference signal CK to be recorded with a relatively long duration. However, the space or period resulting from the limitation of the video part of each effective scanning line which is recorded may be used for repeated recording of the synchronizing signal SYNC, for recording a synchronizing signal used for segment recording and reproducing, for recording an editing key signal or time code signal, and/or for recording an auxiliary signal for picture quality correction.

On the other hand, instead of recording reference signals CK of relatively increased duration in the space or time made available by the limiting of the video part of each effective line which is recorded, such limitation of the video part of the TCI signal may be used to correspondingly decrease the recording length along the magnetic tape.

Moreover, in the described embodiment of the invention, the video signal for each field is recorded on four recording tracks in a so-called segment mode. However, it will be appreciated that the invention can be similarly applied to other recording systems or modes. It will also be appreciated that the invention can be readily applied to recording of video signals on media other than the specifically described magnetic tape.

Although a preferred embodiment of the invention has been described in detail herein with reference to the accompanying drawings, it will be apparent that the invention is not limited to that specific embodiment, and that various changes and modifications may be effected therein by a person skilled in the art without departing from the scope or spirit of the invention as defined in the appended claims.

What is claimed is:

1. An apparatus for recording a selected one of at least two different types of video signals characterized by different numbers of effective scanning lines and different durations of the video parts in the respective effective scanning lines, comprising:
   analog-to-digital conversion means for converting an input video signal of said selected one type into corresponding digital signals;
   digital signal processing means for successively writing and reading, and thereby temporarily storing, samples of said digital signals from said analog-to-digital conversion means;
   digital-to-analog conversion means for converting digital signals read by said digital signal processing means into analog signals;
   recording signal processing means receiving said analog signals and processing the same to provide a recording signal for recording on a recording medium; and control means for said digital signal processing means operative to select the samples of said digital signals which are successively written, or read from said digital signal processing means so as to limit, in said recording signal, at least one of the number of said effective scanning lines and the duration of the video part in each said effective scanning line to the least of said different numbers of effective scanning lines and the shortest of said different durations, respectively, irrespective of the type of said input video signal.

2. An apparatus according to claim 1; in which said two different types of video signals are a studio standard video signal and a video signal transmitted in the MUSE system.

3. An apparatus according to claim 2; in which said control means is operative to select said samples so as to limit, in said recording signal, the effective scanning lines to those characteristic of said video signal transmitted in the MUSE system.

4. An apparatus according to claim 3; in which said control means is further operative to select said samples so as to limit, in said recording signal, the duration of the video part of each of said effective scanning lines to that characteristic of said video signal transmitted in the MUSE system.

5. An apparatus according to claim 2; in which said control means is operative to select said samples so as to limit, in said recording signal, the duration of the video part of each of said effective scanning lines to said duration characteristic of said video signal transmitted in the MUSE system.

6. An apparatus according to claim 2; in which said studio standard video signal has its 41st to 557th and 603rd to 1120th lines assigned as said effective scanning lines thereof, and the duration of the video part of each of said effective scanning lines is 25.86 $\mu$sec.; and in which said video signal transmitted in the MUSE system has its 42nd to 557th and 604th to 1119th lines assigned as the respective effective scanning lines, and said duration of the video part of each of said effective scanning lines is 25.19 $\mu$sec.

7. An apparatus according to claim 6; in which said control means is operative to select said samples so as to limit, in said recording signal, the effective scanning lines to the 42nd to 557th and 604th to 1119th lines, whereby, when the input video signal is a studio standard video signal, the 41st, 603rd and 1120th scanning lines are omitted from said recording signal.

8. The apparatus according to claim 7; in which said control means is further operative to select said samples so as to limit, in said recording signal, the duration of the video part of each said effective scanning line to 25.19 $\mu$sec., whereby, when the input video signal is a studio standard video signal, the initial and concluding 0.335 $\mu$sec. periods of the video part of each of said effective scanning lines are omitted from said recording signal.

9. The apparatus according to claim 6; in which said control means is operative to select said samples so as to limit, in said recording signal the duration of the video part of each said effective scanning line to 25.19 $\mu$sec., whereby, when the input video signal is a studio standard video signal, the initial and concluding 0.335 $\mu$sec. periods of the video part of each of said effective scanning lines are omitted from said recording signal.

10. The apparatus according to claim 1; further comprising means for adding reference data to said digital signals read from said digital signal processing means.

11. The apparatus according to claim 10 in which said reference data added to said digital signals forms sync and burst-like reference signals when converted by said digital-to-analog conversion means.

12. The apparatus according to claim 10; in which said two different types of video signals are a studio standard video signal and a video signal transmitted in the MUSE system; and in which said control means selects the samples of said digital signals read from said digital signal processing means so as to limit, in said recording signal, at least the duration of the video part in each effective scanning line to said duration characteristic of the video signal transmitted in the MUSE system so that, even when the input video signal is a studio standard video signal, there is a relative long duration in each of said effective scanning lines for recording of said reference data.

* * * * *